United States Patent
Buthler et al.

(10) Patent No.: US 10,841,822 B2
(45) Date of Patent: Nov. 17, 2020

(54) TRANSPORT FORMAT SELECTION METHOD AND DEVICE

(71) Applicant: Intel IP Corporation, Santa Clara, CA (US)

(72) Inventors: Jakob Buthler, Aalborg (DK); John Pedersen, Fjerritslev (DK)

(73) Assignee: Intel IP Corporation, Santa Clara, CA (US)

( * ) Notice: Subject to any disclaimer, the term of this patent is extended or adjusted under 35 U.S.C. 154(b) by 725 days.

(21) Appl. No.: 14/757,953

(22) Filed: Dec. 23, 2015

(65) Prior Publication Data

US 2017/0099129 A1 Apr. 6, 2017

Related U.S. Application Data

(60) Provisional application No. 62/236,785, filed on Oct. 2, 2015.

(51) Int. Cl.

| | |
|---|---|
| *H04W 24/10* | (2009.01) |
| *H04W 28/06* | (2009.01) |
| *H04W 88/06* | (2009.01) |
| *H04W 92/10* | (2009.01) |
| *H04L 12/26* | (2006.01) |

(Continued)

(52) U.S. Cl.
CPC .......... *H04W 24/10* (2013.01); *H04L 1/0003* (2013.01); *H04L 1/0021* (2013.01); *H04L 1/0026* (2013.01); *H04L 1/0039* (2013.01); *H04L 5/0057* (2013.01); *H04L 43/16* (2013.01); *H04W 28/06* (2013.01); *H04W 88/06* (2013.01); *H04W 92/10* (2013.01)

(58) Field of Classification Search
CPC ....... H04B 17/0082–382; H04L 1/0001–0039; H04L 5/003–0098; H04L 43/16; H04W 24/02–10; H04W 28/02–16; H04W 36/30; H04W 48/02–20; H04W 72/005–14; H04W 88/06; H04W 88/10; H04W 92/10
See application file for complete search history.

(56) References Cited

U.S. PATENT DOCUMENTS

| | | | | |
|---|---|---|---|---|
| 2009/0042559 A1* | 2/2009 | Choi | ..................... | H04W 24/10 455/423 |
| 2014/0036710 A1* | 2/2014 | Chin | ..................... | H04W 24/10 370/252 |

(Continued)

*Primary Examiner* — Timothy J Weidner
(74) *Attorney, Agent, or Firm* — Schiff Hardin LLP

(57) ABSTRACT

A communication method and device are described. In the communication method, a quality indicator value associated with the first communication protocol is calculated based on a signal characteristic of first communication protocol. A quality indicator value associated with the first communication protocol is determined based on a signal characteristic of the first communication protocol. Further, a gap time is calculated which represents the time until a next communication gap resulting from a first communication via the first communication protocol and second communication via a second communication protocol. A quality report value can be calculated based on the quality indicator value and a comparison of the gap time and a reporting time threshold value. Further, a quality report can be generated based on the quality report value.

27 Claims, 8 Drawing Sheets

(51) Int. Cl.
 *H04L 5/00* (2006.01)
 *H04L 1/00* (2006.01)

(56) References Cited

U.S. PATENT DOCUMENTS

2015/0282057 A1* 10/2015 Li .................... H04B 7/0871
 455/552.1
2018/0042014 A1* 2/2018 Wu .................... H04W 24/10
 370/336

\* cited by examiner

TRANSPORT FORMAT SELECTION METHOD AND DEVICE

CROSS REFERENCE TO RELATED APPLICATIONS

This patent application claims the benefit of U.S. Provisional Patent Application No. 62/236,785, filed Oct. 2, 2015, titled "TRANSPORT FORMAT SELECTION PROCESS ALGORITHM FOR MULTI-SIM DEVICES," which is incorporated herein by reference in its entirety.

BACKGROUND

Field

Aspects described herein generally relate to transport format selection for wireless communications, including selections in multiple subscriber identity module (SIM) wireless communication configurations.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1:
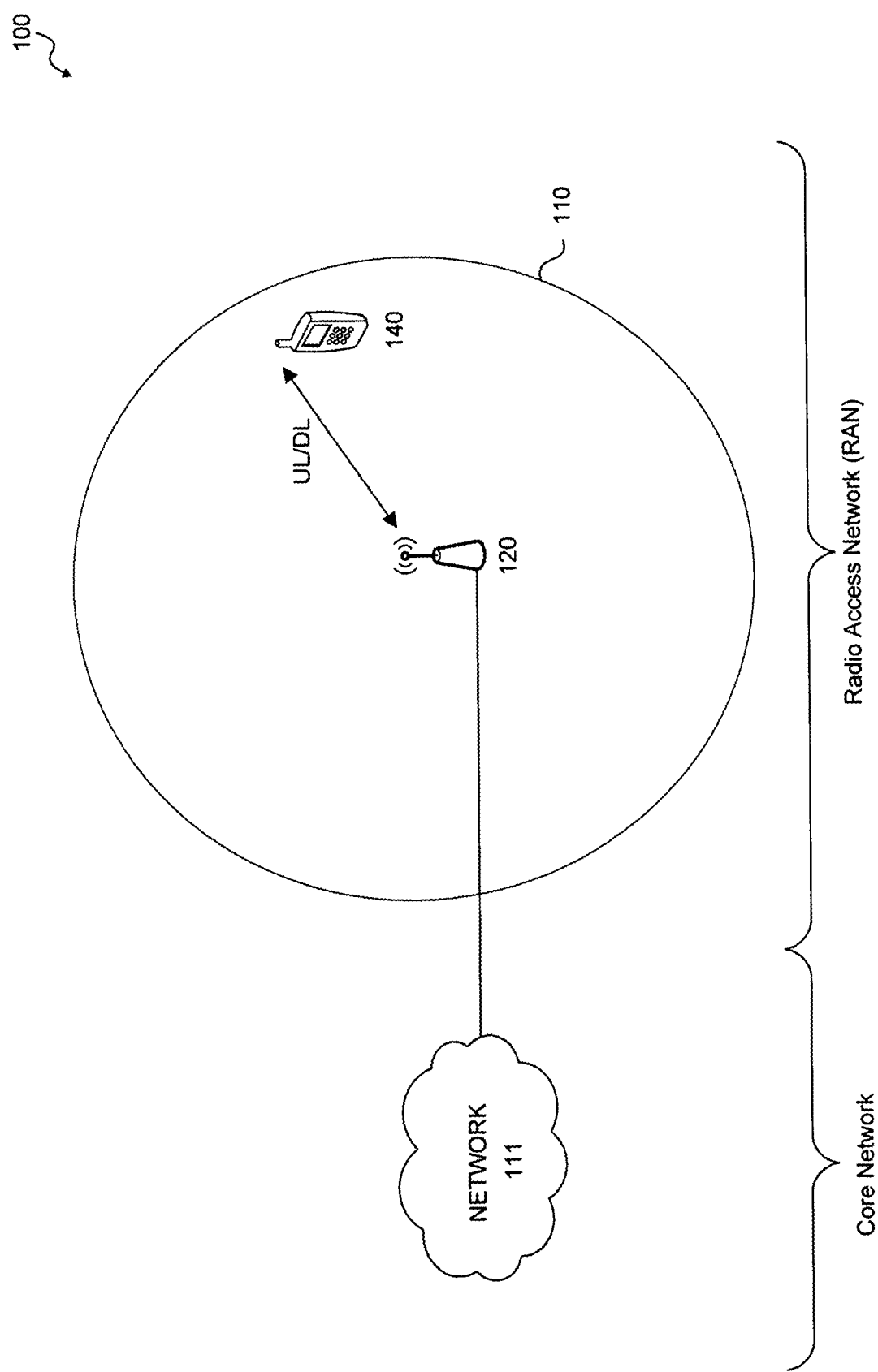
FIG. 1 illustrates an example network environment.

FIG. 1 illustrates an example communication environment 100 that includes a radio access network (RAN) and a core network. The RAN includes one or more base stations 120 and one or more mobile devices 140. The core network includes a backhaul communication network 111. In an exemplary aspect, the backhaul communication network 111 can include one or more well-known communication components—such as one or more network switches, one or more network gateways, and/or one or more servers. The backhaul communication network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the backhaul communication network 111. In an exemplary aspect, the backhaul communication network is an internet protocol (IP) backhaul network.

The number of base stations 120, mobile devices 140, and/or networks 111 are not limited to the exemplary quantities illustrated in FIG. 1, and the communication environment 100 can include any number of the various components as would be understood by one of ordinary skill in the relevant art(s).

In an exemplary aspect, the base station 120 and mobile device 140 each include processor circuitry that is configured to communicate via one or more wireless technologies. The mobile device 140 can be further configured to support co-existing wireless communications with the base station 120, and/or co-existing wireless communications with the base station 120 and one or more other base stations, where the base station 120 supports one or more wireless communications and the other base station supports one or more other wireless communications. In an exemplary aspect, the mobile device 140 can include two or more subscriber identity modules (SIMs) configured for Dual-SIM Dual-Standby (DSDS) operation. For example, a first SIM can support wireless communications (e.g., 2G) on a first wireless network and a second SIM card can support wireless communications (e.g., 2G/3G/4G) on a second wireless network. In an exemplary aspect, the wireless communications on the second wireless network include LTE communications. The first and second networks can be supported by a single base station 120 or multiple base stations.

The mobile device 140 and the base station 120 can each include a transceiver configured to transmit and/or receive wireless communications via one or more wireless technologies within the communication environment 100. In operation, the mobile device 140 can be configured to communicate with the base station 120 in a serving cell or sector 110 of the communication environment 100. For example, the mobile device 140 receives signals on one or more downlink (DL) channels from the base station 120, and transmits signals to the base station 120 on one or more respective uplink (UL) channels.

Examples of the mobile device 140 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some aspects of the present disclosure, the mobile device 140 may be a stationary device, including, for example, a stationary computing device—such as a personal computer (PC), a desktop computer, a computerized kiosk, and an automotive/aeronautical/maritime in-dash computer terminal.

Figure 2:
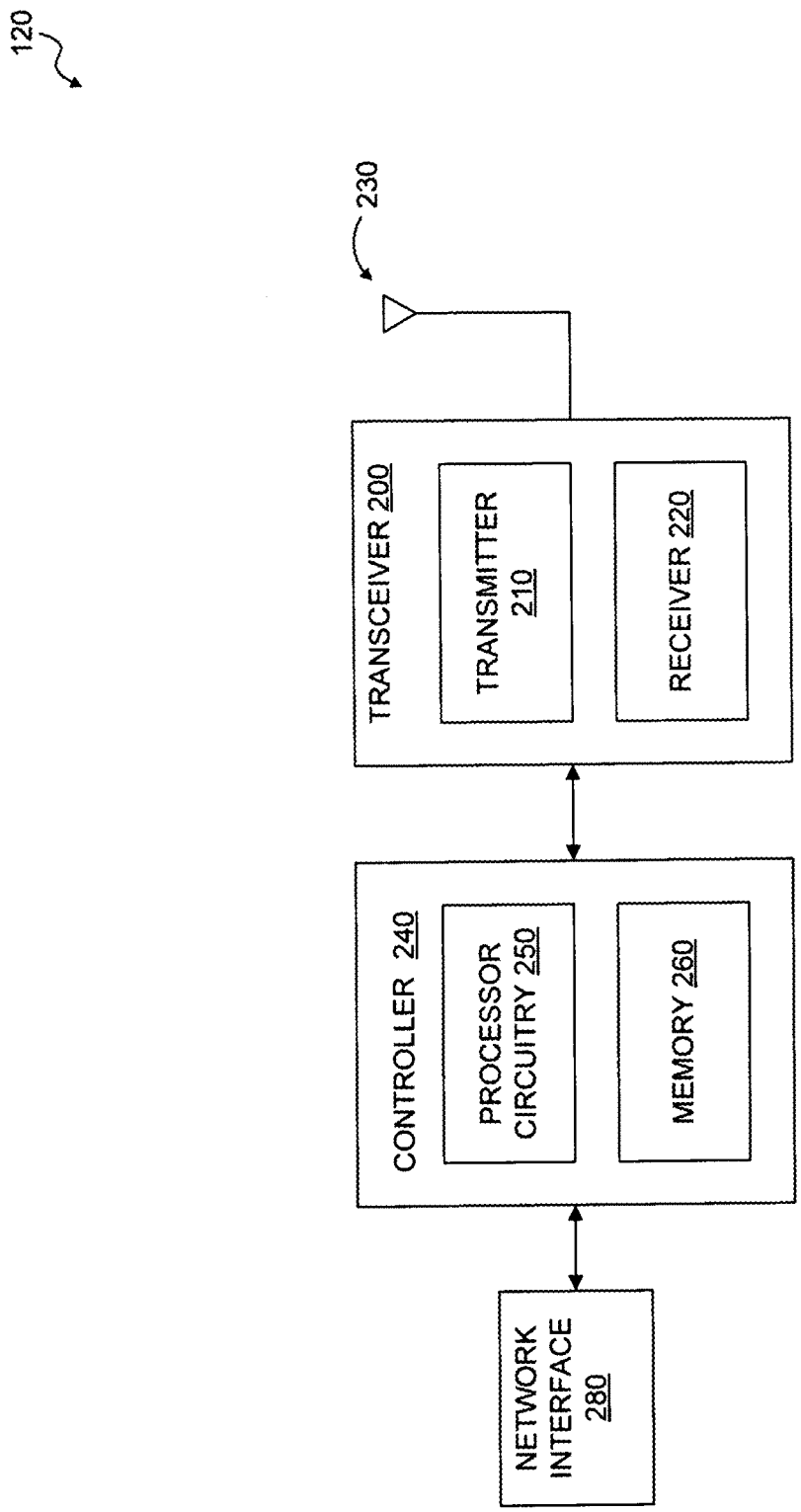
FIG. 2 illustrates a base station according to an exemplary aspect of the present disclosure.

FIG. 2 illustrates the base station 120 according to an exemplary aspect of the present disclosure. For example, the base station 120 can include a transceiver 200 and a network interface 280, each communicatively coupled to controller 240.

The transceiver 200 includes processor circuitry that is configured to transmit and/or receive wireless communications via one or more wireless technologies within the communication environment 100. For example, the transceiver 200 can include one or more transmitters 210 and one or more receivers 220 that configured to transmit and receive wireless communications, respectively, via one or more antennas 230. Those skilled in the relevant art(s) will recognize that the transceiver 200 can also include (but is not limited to) a digital signal processor (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that the antenna 230 may include an integer array of antennas, and that the antenna 230 may be capable of both transmitting and receiving wireless communication signals.

In an exemplary aspect, the transceiver 200 is configured for wireless communications conforming to, for example, the Long-Term Evolution (LTE) protocol. In this example, the transceiver 200 can be referred to as LTE transceiver 200. Those skilled in the relevant art(s) will understand that the transceiver 200 is not limited to LTE communications, and can be configured for communications that conform to one or more other protocols.

The network interface 280 includes processor circuitry that is configured to transmit and/or receive communications via one or more wired technologies to/from the backhaul communication network 111. Those skilled in the relevant art(s) will recognize that the network interface 280 can also include (but is not limited to) a digital signal processer (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will understand that the network interface 280 is not limited to wired communication technologies and can be configured for communications that conform to one or more well-known wireless technologies in addition to, or alternatively to, one or more well-known wired technologies.

The controller 240 can include processor circuitry 250 that is configured to carry out instructions to perform arithmetical, logical, and/or input/output (I/O) operations of the base station 120 and/or one or more components of the base station 120. The processor circuitry 250 can be configured control the operation of the transceiver 200—including, for example, transmitting and/or receiving of wireless communications via the transceiver 200, and/or perform one or more baseband processing functions (e.g., media access control (MAC), encoding/decoding, modulation/demodulation, data symbol mapping, error correction, etc.). In an exemplary aspect, the controller 240 can include one or more elements of a protocol stack such as, for example, elements of an evolved universal terrestrial radio access network (EUTRAN) protocol—including, for example, physical (PHY) layer, media access control (MAC), radio link control (RLC), packet data convergence protocol (PDCP), and/or radio resource control (RRC) elements.

The controller 240 can further include a memory 260 that stores data and/or instructions, where when the instructions are executed by the processor circuitry 250, controls the processor circuitry 250 to perform the functions described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Figure 3:
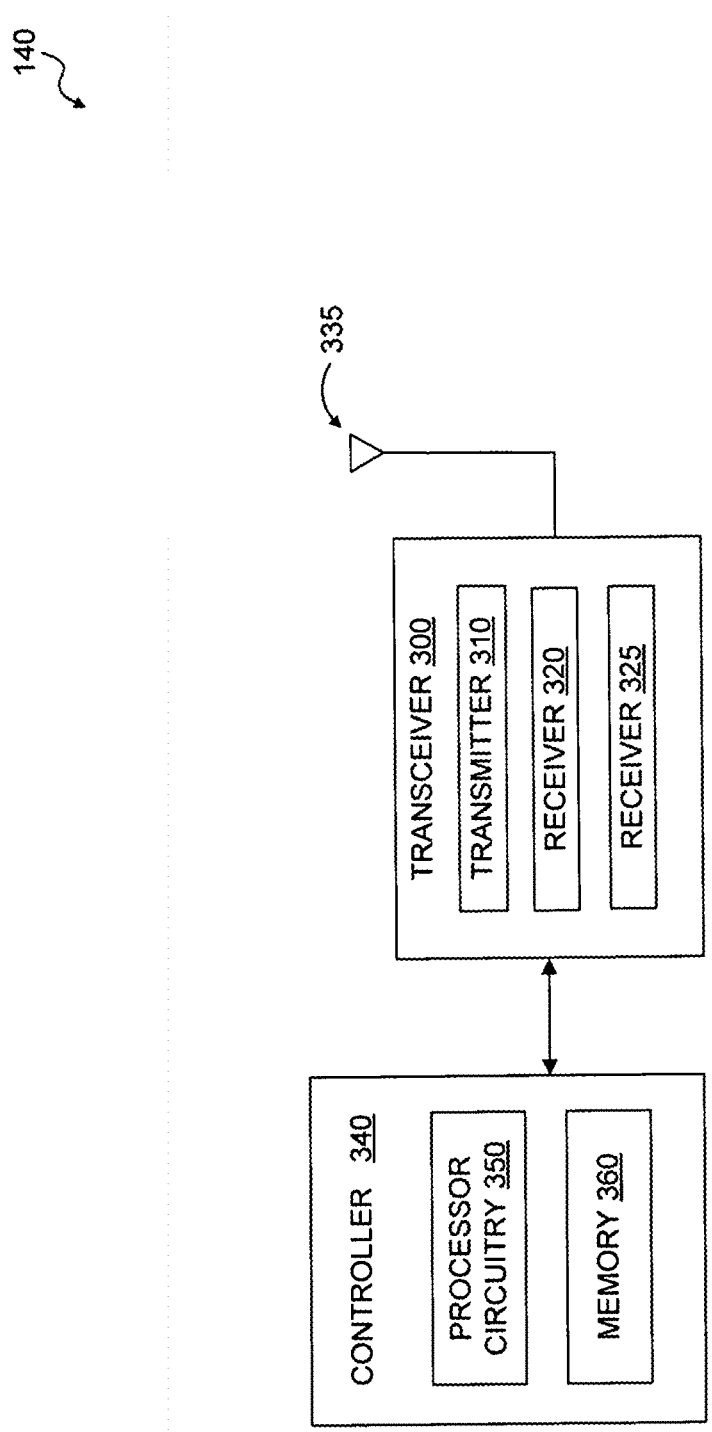
FIG. 3 illustrates a mobile device according to an exemplary aspect of the present disclosure.

FIG. 3 illustrates the mobile device 140 according to an exemplary aspect of the present disclosure. The mobile device 140 can include controller 340 communicatively coupled to one or more transceivers 300 configured to transmit and/or receive wireless communications via one or more wireless technologies within the communication environment 100.

The transceiver 300 can include processor circuitry that is configured for transmitting and/or receiving wireless communications conforming to one or more wireless protocols. For example, the transceiver 300 can include a transmitter 310 and two receivers—receiver 320 and receiver 325—that are configured for transmitting and receiving wireless communications, respectively, via one or more antennas 335.

In exemplary aspects, the transceiver 300 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. Further, those skilled in the relevant art(s) will recognize that antenna 335 may include an integer array of antennas, and that the antennas may be capable of both transmitting and receiving wireless communication signals.

The controller 340 can include processor circuity 340 that is configured to control the overall operation of the mobile device 140, such as the operation of the transceiver 300—including, for example, transmitting and/or receiving of wireless communications via the transceiver 300, and/or perform one or more baseband processing functions (e.g., media access control (MAC), encoding/decoding, modulation/demodulation, data symbol mapping, error correction, etc.); the running of one or more applications and/or operating systems; power management (e.g., battery control and monitoring); display settings; volume control; and/or user interactions via one or more user interfaces (e.g., keyboard, touchscreen display, microphone, speaker, etc.). In an exemplary aspect, the controller 340 can include one or more elements of a protocol stack such as, a physical (PHY) layer, media access control (MAC), radio link control (RLC), packet data convergence protocol (PDCP), and/or radio resource control (RRC) elements.

The controller 340 can further include a memory 360 that stores data and/or instructions, where when the instructions are executed by the processor circuitry 350, controls the processor circuitry 350 to perform the functions described herein. The memory 360 can be any well-known volatile and/or non-volatile memory, and can be non-removable, removable, or a combination of both.

In an exemplary aspect, the mobile device 140 can include two or more subscriber identity modules (SIMs) configured for Dual-SIM Dual-Standby (DSDS) operation. For example, the receiver 320 can be associated with a first SIM card that support wireless communications (e.g., 2G) on a first wireless network and the receiver 325 can be associated with a second SIM card that support wireless communications (e.g., 2G/3G/4G) on a second wireless network.

In operation, the controller 340 can be configured to schedule uplink communications for the first and second wireless networks to perform transmission toggling (TxT). The transmitter 310 can then be configured to transmit the uplink communications based on the transmission schedule(s).

In an exemplary aspect, the mobile device 140 is a Multi-SIM device. In such devices, conflicts may occur when the SIMs are accessing their respective networks simultaneously. The conflicts may lead to bits transferred between the User Equipment (UE) (e.g., mobile device 140) and the base station (e.g., base station 120) to be lost. The loss of bits can be referred to as gaps or blanking. In operation, the gaps can cause an increase in bit errors in the data compared to the typical bit errors resulting from the channel. The bit errors may lead to lost data blocks, requiring retransmission of the lost bits. This can lead to a lower throughput and/or can affect resource management algorithms within the supporting network that react to reduce/block errors.

In an exemplary aspect, to reduce the block errors caused by increases in bit errors resulting from Multi-SIM operations, the robustness of the data block can be increased. For example, if a transport format having a high robustness is used for the communications, the block errors can be reduced by allowing the mobile device to recover the bit errors through error coding.

Although the communication network can adapt to the increased bit error rate by increasing the robustness of the data blocks, this curative action is a reactive process, occurring due to an increase in block errors. In this example, the increase in robustness is initialized before gaps from Multi-SIM operations occur. In exemplary aspects, to increase the amount of correctly received data blocks, a preemptive robustness increase is performed before upcoming Multi-SIM gaps are to occur. As a result, the Block Error Rate (BLER) is reduced, increasing the performance of the wireless communications.

Figure 4:
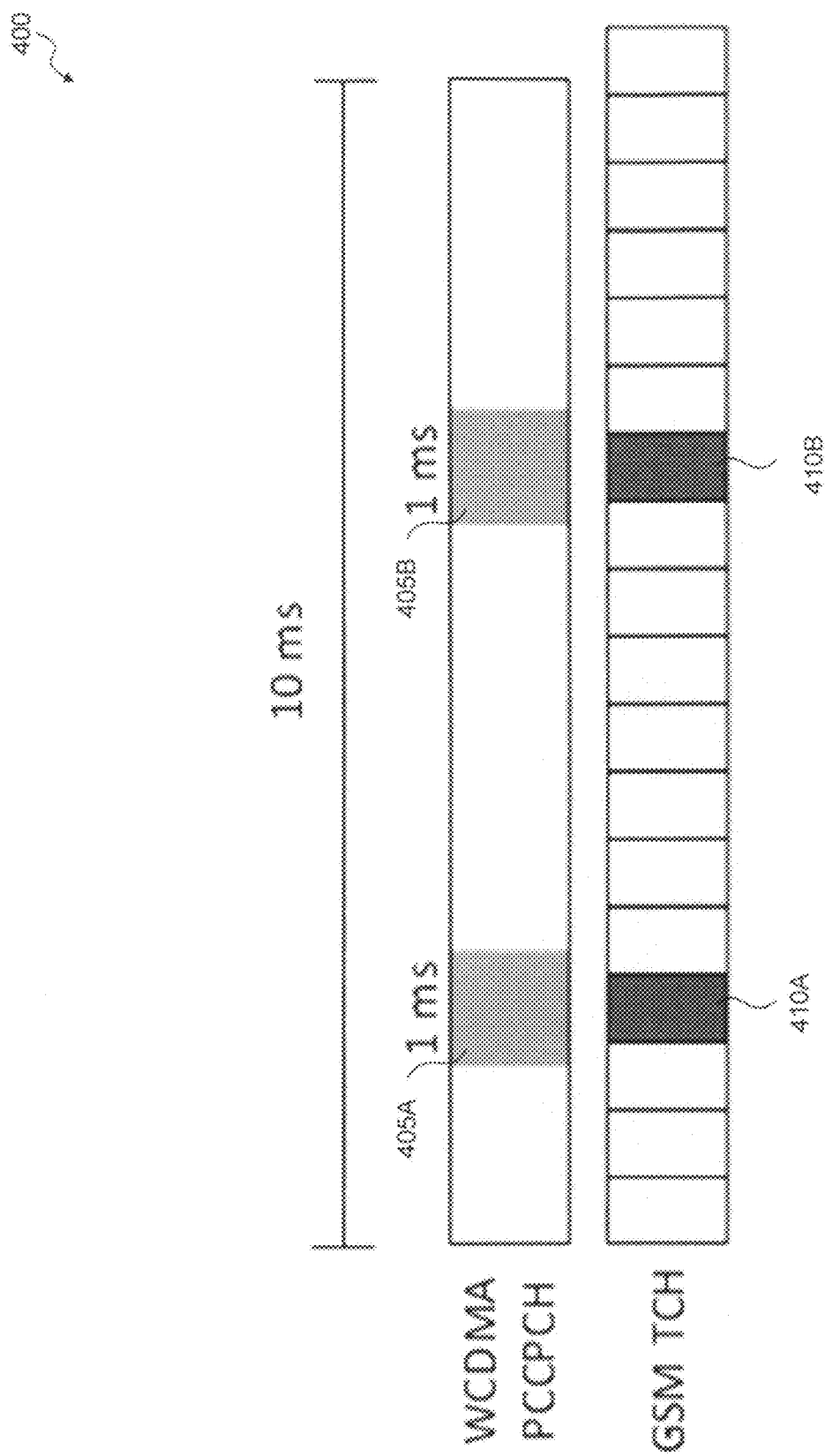
FIG. 4 illustrates communication frames according to an exemplary aspect of the present disclosure.
Figure 5:
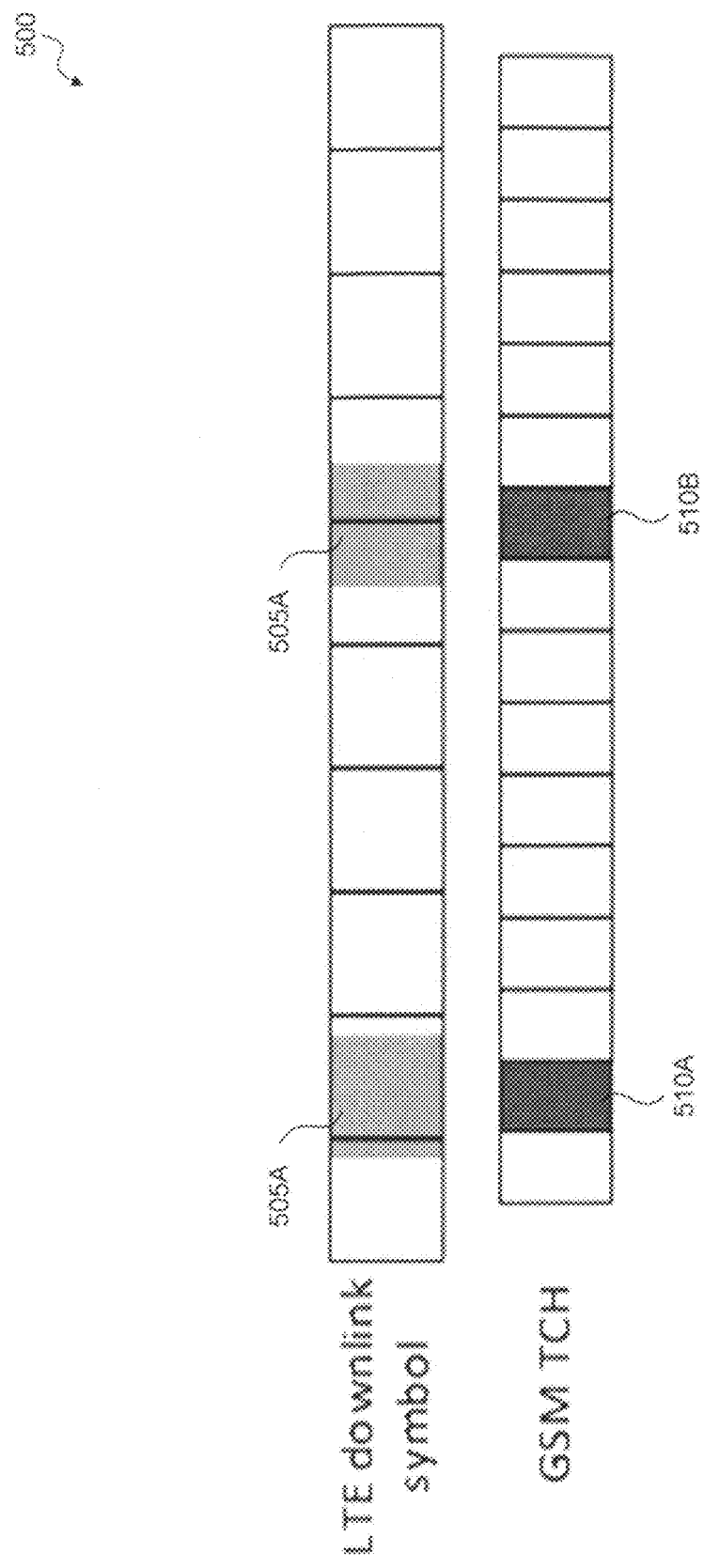
FIG. 5 illustrates communication frames according to an exemplary aspect of the present disclosure.

FIGS. 4 and 5 illustrate communication frames in a Multi-SIM environment. For example, in FIG. 4, the subframes 405 of a first communication protocol (e.g., Wideband Code Division Multiple Access (WCDMA) downlink) and the subframes 410 of a second communication protocol (e.g., Global System for Mobile Communications, originally (GSM) TCH—idle modes) partially conflict. That is, gaps are caused in the WCDMA downlink bursts 405 due to receiving two of the GSM idle mode's four paging blocks. In this example, the gaps are less than the time of the WCDMA data packets. With reference to FIG. 5, the GSM gaps 510 partially cover both of the LTE timeslots 505. With a low robustness of the data blocks encoding, four blocks would be lost in such a situation. By increasing the robustness, the block loss can be reduced.

Typically, the modulation and coding scheme (MCS) used in a transmission is determined by the base station 120 without consideration of the configuration of the mobile device 140, namely that the mobile device 140 is configured for DSDS operation. In this example, the base station 120 will be unaware of upcoming Multi-SIM gaps, and therefore, the base station 120 will be ill-equipped to reduce the BLER.

That is, in order to optimize the achievable throughput of a link, the amount of control bits transferred between mobile device 140 and the base station 120 are generally limited. Therefore, the mobile device 140 generally has no explicit means of signaling to the base station 120 that a future packet is discarded due to Multi-SIM operation and not channel fluctuations.

In LTE, the base station 120 may adapt the link robustness to the channel quality by changing the Modulation and Coding Scheme (MCS). The channel quality is primarily obtained by mobile device 140 measurement reports reported in certain intervals. One of the reporting measures is the Channel Quality Indicator/Index (CQI), which indicates the mobile device's 140 optimum choice of MCS at the currently measured channel quality.

In exemplary aspects, the mobile device 140 can be configured to use CQI reporting as an implicit signaling to request a desired MCS selection as a way to sustain the packet drops due to Multi-SIM operation. In this regard, the mobile device 140 is configured to implicitly request corrective measures, such as an increased robustness to reduce the BLER caused by upcoming gaps as a result of the DSDS operation. In this example, the mobile device 140 can be configured to report reduced channel quality indicator (CQI) to the base station 120 in anticipation of upcoming Multi-SIM gaps. The reduction in CQI can be used to induce the base station 120 to adjust the modulation and coding scheme (MCS) to have an increased robustness (e.g., the mobile device 140 can induce/coax the base station 120 into adjusting the MCS to increase the robustness of the communication channel/link). In this example, the mobile device 140 reports a lower CQI to the base station 120 that is lower than actually indicated by the channel measurement. In this regards, the mobile device 140 "tricks" the base station 120 into using a MCS with a higher robustness than the base station 120 would otherwise utilize. The channel quality measurement is not limited to CQI, and can be include other channel quality indicators, quality indicator values, quality reports, status reports, and/or other quality reporting mechanisms as would be understood by one of ordinary skill in the relevant arts.

In operation, the CQI reports are reported to the base station 120 at regularly known intervals. Therefore, the mobile device 140 can be configured to selectively adjust the CQI that are to be reported to preemptively increase the robustness before anticipated gaps from DSDS operations are to occur.

Figure 6:
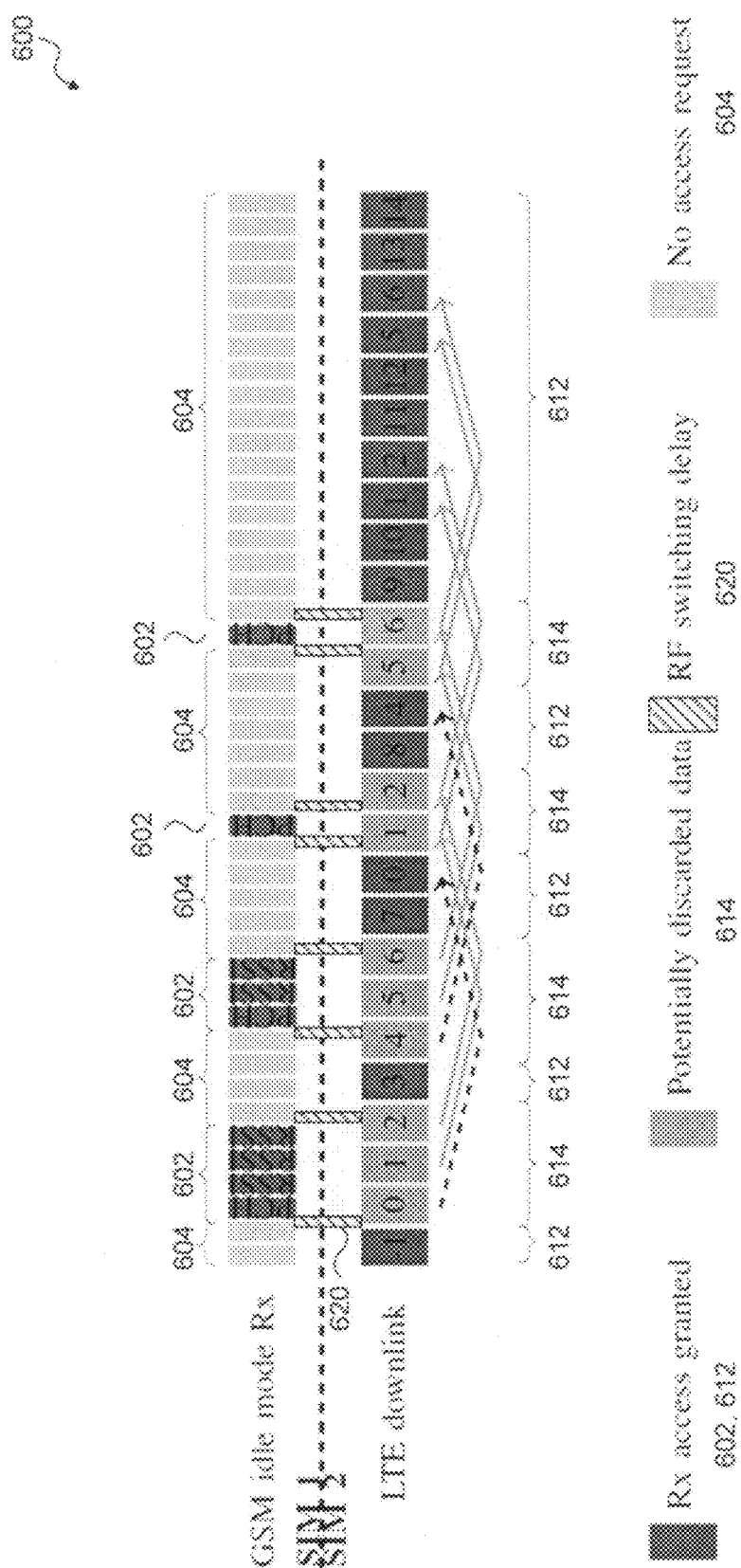
FIG. 6 illustrates a dual-SIM dual active communication procedure according to an exemplary aspect of the present disclosure.

FIG. 6 illustrates a dual-SIM dual active communication procedure 600 according to an exemplary aspect of the present disclosure.

In FIG. 6, an example of gaps introduced by GSM idle mode operations—reading four PCH bursts, and measuring the Received signal strength indication (RSSI) of the serving cell and four neighbor cells. For LTE downlink, the subframe IDs are indicated in the subframe blocks as a reference to when they are retransmitted and received. In this example, it is assumed that it takes approximately 220 μs to tune the front end between the two radio access technologies (RATs), making the minimum gap duration 1 ms. Furthermore, it is assumed that the base station 120 is retransmitting lost packets in intervals of 8 ms, of which the process is illustrated by the arrows. The dashed lines indicates that the gap only causes a single retransmission of the given data subframe, whereas a solid arrow indicates the data subframe is retransmitted within another gap and hence lost again.

The placement of the RSSI measurements are close to the first PCH bursts, as modern handsets are able to decode a paging after receiving only one or two of the four bursts comprising a PCH command. Placing the RSSI measurements in the beginning will therefore decrease the spread in time of the idle mode procedures. With continued reference to FIG. 6, the Multi-SIM gaps causes 10 subframes 614 of data to be lost, whereof subframe 2, 3, 5, and 6 are lost multiple times, increasing the latency of this data. As one of ordinary skill would understand, the timing of GSM and LTE is not the same, hence the offset between the GSM inflicted gaps on the LTE data subframes will be different for each Discontinuous Reception (DRX) period.

Figure 7:
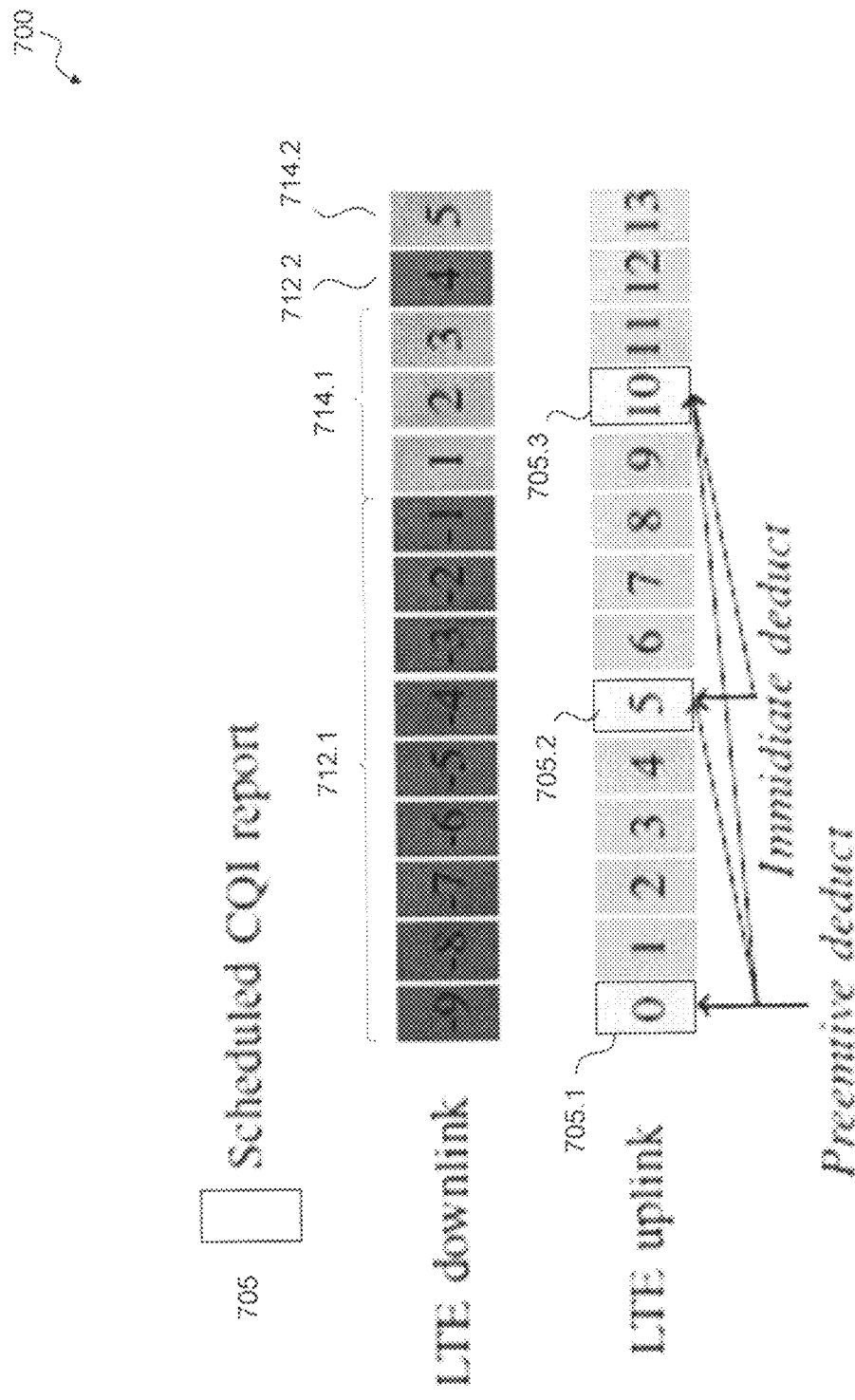
FIG. 7 illustrates a transport format selection method according to an exemplary aspect of the present disclosure.

FIG. 7 illustrates a transport format selection method 700 according to an exemplary aspect of the present disclosure.

Generally, it is possible for algorithms like CQI correction of the base station 120 to react to the sudden increase of instantaneous BLER, by lowering the potential throughput for the mobile device 140. Such decreases in CQI will occur based on the gaps created by the Multi-SIM mobile device 140, but the correction will likely happen after the actual gaps as the subframe error bursts are of short duration. In an exemplary aspect, the mobile device 140 can be configured to schedule CQI reports for regular subframe intervals, such as, for example, for every fifth subframe as set forth in the LTE protocol. The scheduling of CQU reports is not limited to every fifth subframe and can be another interval as would be understood by one of ordinary skill in the relevant arts.

In an exemplary aspect, the mobile device 140 can be configured to increase the link robustness within presence of a gap to decrease the probability of lost subframes, and therefore the decrease the probability of a momentary increase in block loss, which will cause high latency data or a late CQI reduction. In operation, a higher robustness will increase the mobile device's 140 ability to decode data packets partly covered by Multi-SIM gaps, such as subframe 4, or the second retransmission of subframe 5 in FIG. 5. Further, increasing the robustness will ensure that subframe 1 will be received after the 2 retransmissions, and not end up being lost due to channel fluctuations after the actual gap.

As described above, an increase in link robustness can be reported by the mobile device 140 during CQI reports by selecting a lower CQI than what the channel is capable of at the current time.

Turning to FIG. 7, in the LTE downlink, subframes 1-5 (labeled 714.1, 712.2 and 714.2, respectively) represent subframes 0, 1, 2, 3, and 4 illustrated in FIG. 6 and the preceding 9 downlink subframes (e.g., subframes −1 to −9). The bottom blocks illustrate the uplink subframes for the same connection, with the time intervals for a CQI report 705. In the uplink blocks, the mobile device 140 is scheduled to report CQI for every 5th subframe, and is scheduled in uplink subframe 0, 5, and 10 (e.g., 705.1, 705.2, and 705.3).

In an exemplary aspect, the mobile device 140 can be configured to perform quality indicator adjustments, including an immediate deduct operation, a preemptive deduct operation, or a combination of both. In these operations, the quality indicator value (which can include a CQI value) is reduced by deducting a value from the measured quality indicator value.

In an immediate deduct operation, the mobile device 140 (e.g., controller 240) decreases the value of the reported CQI in the CQI report interval immediately before any incoming Multi-SIM gap. For example, the mobile device 140 can be configured to decrease the value of the reported CQI in uplink subframe 5 (705.2) and the next coming CQI reporting intervals (e.g., 705.3) during the gap. This ensures that the subframes lost due to Multi-SIM will have a higher probability of being received as soon as possible after the gaps, lowering the latency of the system, as well as lowering the probability of a PHY layer timeout.

In a preemptive deduct operation, the mobile device 140 (e.g., controller 240) is configured to initiate a reduced CQI reporting based on the base station's 140 maximum retransmission interval. In this example, it is assumed that the base station 140 will retransmit lost subframes at intervals of 8 ms and therefore the reporting of reduced CQI is initiated in uplink subframe 0 (e.g., 705.1) and continued throughout the gap duration (e.g., 705.2 and 705.3). In this case, the CQI reduction is initiated in order to lower the probability of subframes before the gap will be lost and hereby retransmitted within the gap itself. In this example, the preemptive deduct operation can decrease the amount of multiple retransmission of single packets. In some exemplary aspects, the amount of retransmission intervals in which the CQI is preemptively decreased may be changed based on the desired performance.

In an exemplary aspect, the mobile device 140 can be configured to calculate one or more signal characteristics, such as Received signal strength indication (RSSI), of a wireless communication using first communication protocol (e.g., LTE). Based on the signal characteristic, the mobile device 140 can determine a quality indicator value associated with the communication. In an exemplary aspect, the quality indicator value (QI) is a CQI value, but is not limited thereto. In this example, the quality indicator value is the CQI value associated with the RSSI value measured by the mobile device 140. In this regard, the mobile device 140 determines the CQI value based on the signal characteristic (e.g., RSSI).

In operation, the mobile device 140 can be configured to calculate the time until a next Multi-SIM gap. In an exemplary aspect, the mobile device 140, and more specifically, the controller 240 (and processor circuitry 250) can be configured to access (or otherwise have knowledge of) the scheduling of the various communication sessions being conducted by the mobile device 140. Using this scheduling information, the mobile device 140 can determine the upcoming conflicts between the various data communication to calculate the time ($t_{gap}$) until the next Multi-SIM gap.

In an exemplary aspect, the mobile device 140 can calculate a quality report value (QR) based on a comparison of the time until the next gap and the time of a next transmission of the quality report to the base station 140.

For example, the mobile device 140 can be configured to determine the time until the next scheduled CQI report. In an exemplary aspect, this time is supplied by the SIM's internal timers. The periodicity of the scheduled CQI report (e.g., the time until the next report) can be referred to as $t_{report}$.

In an exemplary aspect, the mobile device 140 can determine a reporting time threshold value based on the periodicity of the scheduled CQI report ($t_{report}$). For example, the reporting time threshold value can be calculated based on the following equation:

$$t_{report\_limit} = t_{report} \times (n+1)$$

where $t_{report}$ is periodicity of the scheduled CQI report (e.g., CQI report periodicity of the mobile device 140) and n is a quality report reduction factor. As explained below, the quality report reduction factor (n) can be used to tune/adjust the degree of preemption (e.g., the length of time) before the anticipated gap for the performance of the CQI reduction and the reporting thereof.

In operation, the value of the quality report reduction factor (n) selects between a preemptive deduct operation and an immediate deduct operation. For example, if n=0, the mobile device 140 will be configured to perform an immediate deduct operation where the CQI value is reduced immediately before any incoming Multi-SIM gaps. For larger values of n, the mobile device 140 will configured to operate in a preemptive deduct operation. In this case, the mobile device can initiate a reduced CQI reporting farther in advance of gaps.

Using the reporting time threshold value ($t_{report\_limit}$) the mobile device 140 can determine whether to perform a reduced CQI reporting, or to report the measured CQI. For example, the mobile device 140 can compare the time ($t_{gap}$) until the next Multi-SIM gap and the reporting time threshold value ($t_{report\_limit}$) to determine the CQI reporting mode.

In an exemplary aspect, the mobile device 140 can be configured to calculate the CQI reporting mode based on the following equation:

$$QR = \begin{cases} QI - QI_{deduct}, & \text{when } t_{gap} < t_{report\_limit} \\ QI, & \text{when } t_{gap} \geq t_{report\_limit} \end{cases}$$

where QR is the quality report value (e.g., the reported CQI value), QI is the quality indicator value (e.g., the measured CQI), $t_{gap}$ is the time until the next gap, $t_{report\_limit}$ is the reporting time threshold value, and $QI_{deduct}$ is a quality reduction value representing an expected decrease in performance of the mobile device 140 as a result of the next communication gap.

In this example, the quality reduction value ($QI_{deduct}$), also referred to as an expected degradation value of the mobile device's 140 performance, is calculated by the mobile device 140, or is a predetermined value. The quality reduction value ($QI_{deduct}$) quantifies the impact of Multi-SIM gaps on the mobile device's 140 performance.

In operation, the deduction of the quality reduction value ($QI_{deduct}$) will be chosen or have a dynamic range that will result in a valid CQI value for the quality report value QR (e.g., the reported CQI value). That is, the quality reduction value ($QI_{deduct}$) is selected such that the quality report value QR will not cause the base station 140 to halt or otherwise reduce communications with the mobile device 140.

In an exemplary aspect, the transport format selection method to increase robustness can be used for uplink transmission. In an exemplary aspect, the mobile device 140 can include two SIMs configured for Dual SIM-Dual active (DSDA) operation. For example, the receiver 320 can be associated with a first SIM card that support wireless communications (e.g., 2G) on a first wireless network and the receiver 325 can be associated with a second SIM card that support wireless communications (e.g., 2G/3G/4G) on a second wireless network. In this example, the transmitter 310 is configured to support wireless communications on both the first and second wireless networks, and configured to perform transmission toggling (TxT) based on one or more transmission schedules associated with the first and/or second wireless networks. In an exemplary aspect, the scheduling of uplink communications can include toggling of transmissions (i.e., TxT) between the wireless networks associated with the mobile device 140 to multiplex two or more transmissions (e.g., a first uplink transmission associated with the first SIM card and a second uplink transmission associated with the second SIM card) in the time and/or frequency domains.

Figure 8:
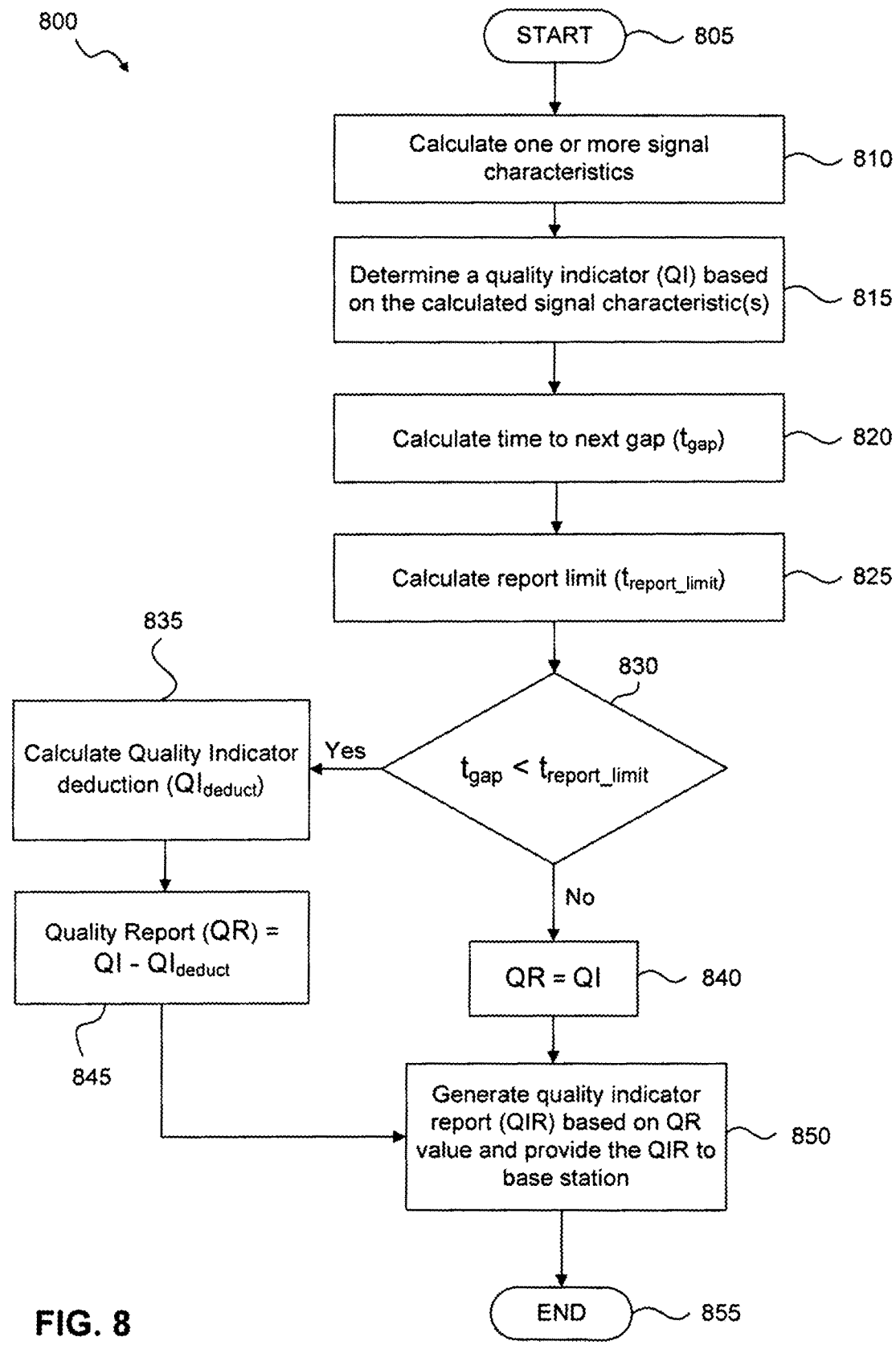
FIG. 8 illustrates a transport format selection method according to an exemplary aspect of the present disclosure.

FIG. 8 illustrates a retransmission procedure 800 according to an exemplary aspect of the present disclosure. The flowchart is described with continued reference to FIGS. 1-7. The steps of the method are not limited to the order described below, and the various steps may be performed in a different order. Further, two or more steps of the method may be performed simultaneously with each other.

The method of flowchart 800 begins at step 805 and transitions to step 810, where one or more signal characteristics are calculated. For example, the mobile device 140 can calculate one or more signal characteristics, such as Received signal strength indication (RSSI), of a wireless communication using first communication protocol (e.g., LTE).

After step 810, the method of flowchart 800 transitions to step 815, where a quality indicator value (QI) associated with the communication is determined. For example, the mobile device 140 can determine, calculate, measure, or otherwise obtain a CQI value based on the calculated signal characteristic(s) (e.g., based on the RSSI value).

After step 815, the method of flowchart 800 transitions to step 820, where the time until a next Multi-SIM gap is calculated. For example, the mobile device 140 can be configured to calculate the time ($t_{gap}$) until a next Multi-SIM gap using the scheduling of the various communication sessions being conducted by the mobile device 140.

After step 820, the method of flowchart 800 transitions to step 825, where the reporting time threshold value ($t_{report\_limit}$) is calculated. For example, the mobile device 140 can calculate the reporting time threshold value ($t_{report\_limit}$) based on the time until the next ort scheduled CQI report ($t_{report}$) and the quality report reduction factor (n).

After step 825, the method of flowchart 800 transitions to step 830, where the time ($t_{gap}$) until a next Multi-SIM gap is compared with the reporting time threshold value ($t_{report\_limit}$). If the time ($t_{gap}$) until a next Multi-SIM gap is less than the reporting time threshold value ($t_{report\_limit}$) (YES at step 830), the flowchart 800 transitions to step 835 and the mobile device 140 performs a reduced CQI reporting operation. Otherwise (NO at step 830, the flowchart 800 transitions to step 840 where the quality report value (QR) is set as the quality indicator value (QI). That is, the CQI is not reduced and the measured CQI is used in the CQI reporting.

At step 835, the quality reduction value ($QI_{deduct}$) is calculated. For example, the mobile device 140 can be configured to calculate the quality reduction value ($QI_{deduct}$) by calculating or estimating the impact of the Multi-SIM gaps on the mobile device's 140 performance. In other aspects, the quality reduction value ($QI_{deduct}$) can be predetermined value, such as a fixed value, or a value that is predetermined based on the number of gaps, length of gaps, frequency of gaps, or one or more other parameters.

After step 835, the method of flowchart 800 transitions to step 845, where the quality report value (QR) is calculated. For example, the mobile device 140 can calculate the quality report value (QR) by subtracting the quality reduction value ($QI_{deduct}$) from the quality indicator value (QI). In this regard, the mobile device 140 can subtract the quality reduction value ($QI_{deduct}$) from the measured CQI value to determine the reduced CQI value.

After step 845, the method of flowchart 800 transitions to step 850, where the quality indicator report (QIR) is generated based on the calculated quality report value (QR). For example, the mobile device 140 can generate a CQI report that includes the CQI having the determined quality report value (QR).

After step 850, the flowchart transistions to step 855 where the flowchart 500 ends. The method may be repeated, such as for the next Multi-SIM gaps within the communications.

EXAMPLES

Example 1 is a communication method using a first communication device configured to communicate with a second communication device via a communication link, comprising: calculating a gap time until a next communication gap resulting from a first communication via a first communication protocol and a second communication via a second communication protocol; generating a quality report based on the gap time; and providing the quality report to the second communication device to increase a robustness of the communication link.

In Example 2, the subject matter of Example 1, wherein generating the quality report comprises: determining a quality indicator value associated with the first communication protocol based on a signal characteristic of the first communication protocol; and calculating a quality report value based on the quality indicator value and a comparison of the gap time and a reporting time threshold value, wherein the generation of the quality report is based on the quality report value.

In Example 3, the subject matter of Example 2, wherein the reporting time threshold value is calculated based on a time of a next transmission of the quality report to the second communication device and a quality report reduction factor.

In Example 4, the subject matter of Example 2, wherein calculating the quality report value comprises: reducing the quality indicator value by a quality reduction value in a first mode of operation; and setting the quality report value as the quality indicator value in a second mode of operation.

In Example 5, the subject matter of Example 4, wherein a selection between the first and the second modes of operation is based on the comparison of the gap time and the reporting time threshold value.

In Example 6, the subject matter of Example 4, wherein reducing the quality indicator value by the quality reduction value induces the second communication device to adjust a transport format of the first communication protocol.

In Example 7, the subject matter of Example 2, wherein: the quality indicator value is a channel quality indicator (CQI) associated with the first communication protocol; and the quality report value is the CQI in a first mode of operation and is a reduced CQI in a second mode of operation, the reduced CQI being a difference of the CQI and a degradation value.

In Example 8, the subject matter of Example 7, wherein the degradation value represents an expected decrease in performance of the first communication device as a result of the next communication gap.

In Example 9, the subject matter of Example 2, wherein calculating the quality report value satisfies the following equation:

$$QR = \begin{cases} QI - QI_{deduct}, & \text{when } t_{gap} < t_{report\_limit} \\ QI, & \text{when } t_{gap} \geq t_{report\_limit} \end{cases}$$

wherein QR is the quality report value, QI is the quality indicator value, tgap is the gap time until the next communication gap, treport_limit is the reporting time threshold value, and QIdeduct is a quality reduction value representing an expected decrease in performance of the first communication device as a result of the next communication gap.

In Example 10, the subject matter of Example 9, wherein the reporting time threshold value is based on a time of a next transmission of the quality report to the second communication device.

In Example 11, the subject matter of Example 1, further comprising: calculating the signal characteristic of the first communication protocol, wherein the signal characteristic is a Received Signal Strength Indicator (RSSI) value associated with the first communication protocol.

In Example 12, the subject matter of Example 1, wherein the second communication device has knowledge of the gap time based on at least one of: an analysis of a behavior of the first communication device; and one or more status reports provided to the second communication device by the first communication device.

Example 13 is a communication device configured to communicate with a second communication device, comprising: a transceiver configured to transmit or receive one or more communications; and a controller configured to: calculate a gap time until a next communication gap resulting from a first communication via a first communication protocol and a second communication via a second communication protocol; generate a quality report based on the gap time; and transmit, using the transceiver, the quality report to the second communication device to increase a robustness of the communication link.

In Example 14, the subject matter of Example 13, wherein the generation of the quality report comprises: calculating the signal characteristic of the first communication protocol; determining a quality indicator value associated with the first communication protocol based on the signal characteristic; and calculating a quality report value based on the quality indicator value and a comparison of the gap time and a reporting time threshold value, wherein the generation of the quality report is based on the quality report value.

In Example 15, the subject matter of Example 14, wherein the reporting time threshold value is calculated based on a time of a next transmission of the quality report to the second communication device and a quality report reduction factor.

In Example 16, the subject matter of Example 14, wherein calculating the quality report value comprises: reducing the quality indicator value by a quality reduction value in a first mode of operation; and setting the quality report value as the quality indicator value in a second mode of operation.

In Example 17, the subject matter of Example 16, wherein a selection between the first and the second modes of operation is based on the comparison of the gap time and the reporting time threshold value.

In Example 18, the subject matter of Example 16, wherein reducing the quality indicator value by the quality reduction value induces the second communication device to adjust a transport format of the first communication protocol.

In Example 19, the subject matter of Example 14, wherein: the quality indicator value is a channel quality indicator (CQI) associated with the first communication protocol; and the quality report value is the CQI in a first mode of operation and is a reduced CQI in a second mode of operation, the reduced CQI being a difference of the CQI and a degradation value.

In Example 20, the subject matter of Example 19, wherein the degradation value represents an expected decrease in performance of the communication device as a result of the next communication gap.

In Example 21, the subject matter of Example 14, wherein the controller is configured to calculate the quality report value to satisfy the following equation:

$$QR = \begin{cases} QI - QI_{deduct}, & \text{when } t_{gap} < t_{report\_limit} \\ QI, & \text{when } t_{gap} \geq t_{report\_limit} \end{cases},$$

wherein QR is the quality report value, QI is the quality indicator value, tgap is the gap time until the next communication gap, treport_limit is the reporting time threshold value, and QIdeduct is a quality reduction value representing an expected decrease in performance of the communication device as a result of the next communication gap.

In Example 22, the subject matter of Example 21, wherein the reporting time threshold value is based on a time of a next transmission of the quality report to the second communication device.

Example 23 is a communication method using a Dual-SIM Dual-Standby (DSDS) communication device configured to communicate using first and second communication protocols, comprising: determining a channel quality indicator (CQI) associated with the first communication protocol; calculating a gap time until a next communication gap resulting from a first communication via the first communication protocol and second communication via the second communication protocol in a DSDS operation; reducing the CQI by a quality reduction value based on a comparison of the gap time and a reporting time threshold value; and generating a CQI report based on the reduced CQI, the reporting time threshold value being based on a time of a next transmission of the CQI report to a base station serving the communication device.

In Example 24, the subject matter of Example 22, wherein the CQI is reduced by the quality reduction value when the gap time is less than the reporting time threshold value.

In Example 25, the subject matter of Example 22, wherein reducing the CQI by the quality reduction value induces the base station serving the communication device to adjust a transport format of the first communication protocol.

Example 26 is an apparatus comprising means to perform the method as described in any of Examples 1-12 and 23-25. 27.

Example 27 is a computer program product embodied on a computer-readable storage medium comprising program instructions, when executed, causes a processor to perform the method of any of Examples 1-12 and 23-25.

Example 28 is an apparatus substantially as shown and described.

Example 29 is a method substantially as shown and described.

In Example 30, the subject matter of Example 1, wherein the providing the quality report to the second communication device induces the second communication device to increase the robustness of the communication link.

In Example 31, the subject matter of Example 13, wherein the controller is configured to transmit the quality report to the second communication device to induce the second communication device to increase the robustness of the communication link.

CONCLUSION

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

As will be apparent to a person of ordinary skill in the art based on the teachings herein, exemplary aspects are not limited to Long-Term Evolution (LTE), and can be applied to other cellular communication standards, including (but not limited to) Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (Institute of Electrical and Electronics Engineers (IEEE) 802.16) to provide some examples. Further, exemplary aspects are not limited to cellular communication networks and can be used or implemented in other kinds of wireless communication access networks, including (but not limited to) one or more IEEE 802.11 protocols, Bluetooth, Near-field Communication (NFC) (ISO/IEC 18092), ZigBee (IEEE 802.15.4), and/or Radio-frequency identification (RFID), to provide some examples. Further, exemplary aspects are not limited to the above wireless networks and can be used or implemented in one or more wired networks using one or more well-known wired specifications and/or protocols.

What is claimed is:

1. A Dual-SIM Dual-Standby (DSDS) communication method using a first communication device configured to communicate with a second communication device via a communication link, comprising:
    calculating a gap time duration until a next DSDS scheduling conflict of a transceiver of the first communication device between a first scheduled communication via a first communication protocol and a second scheduled communication via a second communication protocol;
    determining a time of a next transmission of a quality report to the second communication device;
    adjusting a quality report adjustment factor to adjust a degree of preemption of a quality report generation before the next DSDS scheduling conflict;
    adjusting the determined time of the next transmission of the quality report, based on the quality report adjustment factor, to generate an adjusted quality report transmission time;
    generating a quality report based on a comparison of the gap time duration until the next DSDS scheduling conflict and the adjusted quality report transmission time; and
    instructing the second communication device to increase a robustness of the communication link based on the quality report.

2. The communication method of claim 1, wherein generating the quality report comprises:
    determining a quality indicator value associated with the first communication protocol based on a signal characteristic of the first communication protocol; and
    calculating a quality report value based on the quality indicator value and a comparison of the gap time duration and a reporting time threshold value, wherein the generation of the quality report is based on the quality report value.

3. The communication method of claim 2, wherein the reporting time threshold value is calculated based on the time of the next transmission of the quality report to the second communication device and the quality report adjustment factor.

4. The communication method of claim 2, wherein calculating the quality report value comprises:
    reducing the quality indicator value by a quality reduction value in a first mode of operation; and
    setting the quality report value as the quality indicator value in a second mode of operation.

5. The communication method of claim 4, wherein a selection between the first and the second modes of operation is based on the comparison of the gap time duration and the reporting time threshold value.

6. The communication method of claim 4, wherein reducing the quality indicator value by the quality reduction value induces the second communication device to adjust a transport format of the first communication protocol to increase the robustness of the communication link.

7. The communication method of claim 2, wherein:
    the quality indicator value is a channel quality indicator (CQI) associated with the first communication protocol; and
    the quality report value is the CQI in a first mode of operation and is a reduced CQI in a second mode of operation, the reduced CQI being a difference of the CQI and a degradation value.

8. The communication method of claim 7, wherein the degradation value represents an expected decrease in performance of the first communication device as a result of the next communication gap.

9. The communication method of claim 2, wherein calculating the quality report value satisfies the following equation:

$$QR = \begin{cases} QI - QI_{deduct}, & \text{when } t_{gap} < t_{report\_limit} \\ QI, & \text{when } t_{gap} \geq t_{report\_limit} \end{cases}$$

wherein QR is the quality report value, QI is the quality indicator value, $t_{gap}$ is the gap time duration until the next communication gap, $t_{report\_limit}$ is the reporting time threshold value, and $QI_{deduct}$ is a quality reduction value representing an expected decrease in performance of the first communication device as a result of the next communication gap.

10. The communication method of claim 9, wherein the reporting time threshold value is based on the time of the next transmission of the quality report to the second communication device.

11. The communication method of claim 2, further comprising:
    calculating the signal characteristic of the first communication protocol, wherein the signal characteristic is a Received Signal Strength Indicator (RSSI) value associated with the first communication protocol.

12. The communication method of claim 1, wherein the second communication device has knowledge of the gap time based on at least one of:
    an analysis of a behavior of the first communication device; and
    one or more status reports provided to the second communication device by the first communication device.

13. The communication method of claim 1, wherein a modulation and coding scheme (MCS) or a transport format is adjusted to increase the robustness of the communication link.

14. The communication method of claim 1, wherein adjusting the quality report adjustment factor controls the first communication device to selectively operate in a pre-emptive deduct operation mode and an immediate deduct operation mode.

15. A Dual-SIM Dual-Standby (DSDS) communication device configured to communicate with a second communication device, comprising:
    a transceiver configured to transmit or receive one or more communications; and
    a controller configured to:
        calculate a gap time duration until a next DSDS scheduling conflict of the transceiver between a first scheduled communication via a first communication protocol and a second scheduled communication via a second communication protocol;
        determine a time of a next transmission of a quality report to the second communication device;
        adjust a quality report adjustment factor to adjust a degree of preemption of a quality report generation before the next DSDS scheduling conflict;
        adjust the determined time of the next transmission of the quality report based on the quality report adjustment factor to generate an adjusted quality report transmission time;
        generate a quality report based on a comparison of the gap time duration until the next DSDS scheduling conflict and the adjusted quality report transmission time; and
        transmit, using the transceiver, the quality report to the second communication device to instruct the second communication device to increase a robustness of the communication link.

16. The communication device of claim 15, wherein the generation of the quality report comprises:
    calculating a signal characteristic of the first communication protocol;
    determining a quality indicator value associated with the first communication protocol based on the signal characteristic; and
    calculating a quality report value based on the quality indicator value and a comparison of the gap time duration and a reporting time threshold value, wherein the generation of the quality report is based on the quality report value.

17. The communication device of claim 16, wherein the reporting time threshold value is calculated based on a time of a next transmission of the quality report to the second communication device and the quality report adjustment factor.

18. The communication device of claim 16, wherein calculating the quality report value comprises:
    reducing the quality indicator value by a quality reduction value in a first mode of operation; and
    setting the quality report value as the quality indicator value in a second mode of operation.

19. The communication device of claim 18, wherein a selection between the first and the second modes of operation is based on the comparison of the gap time duration and the reporting time threshold value.

20. The communication device of claim 18, wherein reducing the quality indicator value by the quality reduction value induces the second communication device to adjust a transport format of the first communication protocol to increase the robustness of the communication link.

21. The communication device of claim 16, wherein:
    the quality indicator value is a channel quality indicator (CQI) associated with the first communication protocol; and
    the quality report value is the CQI in a first mode of operation and is a reduced CQI in a second mode of operation, the reduced CQI being a difference of the CQI and a degradation value.

22. The communication device of claim 21, wherein the degradation value represents an expected decrease in performance of the communication device as a result of the next communication gap.

23. The communication device of claim 16, wherein the controller is configured to calculate the quality report value to satisfy the following equation:

$$QR = \begin{cases} QI - QI_{deduct}, & \text{when } t_{gap} < t_{report\_limit} \\ QI, & \text{when } t_{gap} \geq t_{report\_limit} \end{cases}$$

wherein QR is the quality report value, QI is the quality indicator value, $t_{gap}$ is the gap time duration until the next communication gap, $t_{report\_limit}$ is the reporting time threshold value, and $QI_{deduct}$ is a quality reduction value representing an expected decrease in performance of the communication device as a result of the next communication gap.

24. The communication device of claim 23, wherein the reporting time threshold value is based on the time of the next transmission of the quality report to the second communication device.

25. A communication method using a Dual-SIM Dual-Standby (DSDS) communication device configured to communicate using first and second communication protocols, comprising:
    determining a channel quality indicator (CQI) associated with the first communication protocol;
    calculating a gap time duration until a next DSDS scheduling conflict of the transceiver of the DSDS communication device between a first scheduled communication via the first communication protocol and second scheduled communication via the second communication protocol in a DSDS operation;
    determining a time of a next transmission of a CQI report to a base station serving the communication device;
    adjusting a quality report adjustment factor to adjust a degree of preemption of a CQI report generation before the next DSDS scheduling conflict;
    adjusting the determined time of the next transmission of the CQI report based on the quality report adjustment factor to generate a reporting time threshold value;
    reducing the CQI by a quality reduction value based on a comparison of the gap time duration and the reporting time threshold value; and
    generating the CQI report based on the reduced CQI.

26. The communication method of claim 25, wherein the CQI is reduced by the quality reduction value when the gap time duration is less than the reporting time threshold value.

27. The communication method of claim 25, wherein reducing the CQI by the quality reduction value induces the base station serving the communication device to adjust a transport format of the first communication protocol.

* * * * *